United States Patent
Takahashi

(10) Patent No.: US 12,330,762 B2
(45) Date of Patent: Jun. 17, 2025

(54) AUTOMATIC STEERING DEVICE, AUTOMATIC STEERING SYSTEM, AUTOMATIC STEERING METHOD, AND AUTOMATIC STEERING PROGRAM

(71) Applicant: FURUNO ELECTRIC CO., LTD., Hyogo (JP)

(72) Inventor: Tomoyasu Takahashi, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 218 days.

(21) Appl. No.: 18/178,777

(22) Filed: Mar. 6, 2023

(65) Prior Publication Data

US 2023/0294812 A1     Sep. 21, 2023

(30) Foreign Application Priority Data

Mar. 16, 2022 (JP) .................................. 2022-041377

(51) Int. Cl.
*B63H 25/06* (2006.01)
(52) U.S. Cl.
CPC .................................. *B63H 25/06* (2013.01)
(58) Field of Classification Search
None
See application file for complete search history.

(56) References Cited

U.S. PATENT DOCUMENTS 4,074,648 A    2/1978  Reid et al.
5,179,905 A *  1/1993  Hossfield ............. G05D 1/0206
                                             318/588
7,403,841 B2   7/2008  Yamakawa et al.

FOREIGN PATENT DOCUMENTS

EP    0 189 248 A2    7/1986
JP    2003-104291 A    4/2003
JP    2006-044411 A    2/2006

OTHER PUBLICATIONS

Bob Pusateri, Is it time to abandon your analog controls?, Sep. 24, 2021 (Year: 2021).*
The extended European search report issued by the European Patent Office on Jun. 20, 2023, which corresponds to European Patent Application No. 23161546.9-1205 and is related to U.S. Appl. No. 18/178,777.
Chen C. et al., "An Energy-Efficient Adaptive Course Control System for Ocean Surface Ships", 11th International Workshop on Ship and Marine Hydrodynamics, Sep. 25, 2019, pp. 1-10, Hamburg, Germany, doi: 10.15480/882.3349.

* cited by examiner

*Primary Examiner* — Christian Chace
*Assistant Examiner* — Shayne M. Gilbertson
(74) *Attorney, Agent, or Firm* — Studebaker Brackett PLLC

(57) ABSTRACT

An automatic steering device includes an acquirer, and processing circuitry. The acquirer acquires a traveling state including a heading or a position of a ship, and ship information on the ship. The processing circuitry calculates a first evaluation value that is an evaluation value indicative of a performance for maintaining the heading of the ship or a route based on the traveling state. The processing circuitry calculates a second evaluation value that is an evaluation value related to a ship handling control based on the ship information. The processing circuitry sets a control parameter related to a motion control of the ship based on the first evaluation value or the second evaluation value.

20 Claims, 5 Drawing Sheets

AUTOMATIC STEERING DEVICE, AUTOMATIC STEERING SYSTEM, AUTOMATIC STEERING METHOD, AND AUTOMATIC STEERING PROGRAM

CROSS-REFERENCE TO RELATED APPLICATION(S)

This application claims priority under 35 U.S.C. § 119 to Japanese Patent Application No. 2022-041377, which was filed on Mar. 16, 2022, the entire disclosure of which is hereby incorporated by reference.

TECHNICAL FIELD

The present disclosure relates to an art for automatically controlling a rudder angle.

BACKGROUND OF THE DISCLOSURE

Parameters for controlling a rudder angle of an autopilot often use fixed values. If the fixed values are used as the control parameters, the control may not suitably be performed according to the cargo weight and the weather. Thus, a deterioration of the control accuracy and an excessive steering may be induced.

SUMMARY OF THE DISCLOSURE

Therefore, one purpose of the present disclosure is to provide an adaptive setting technique for control parameters, which can realize a stable ship control corresponding to changes in internal and external environments which have influences on traveling of a ship.

According to one aspect of the present disclosure, an automatic steering device is provided, which includes an acquirer and processing circuitry. The acquirer acquires a traveling state including a heading or a position of a ship, and ship information on the ship. The processing circuitry calculates a first evaluation value which is an evaluation value indicative of a performance for maintaining the heading of the ship or a route based on the traveling state. The processing circuitry calculates a second evaluation value which is an evaluation value related to a ship handling control based on the ship information. The processing circuitry sets a control parameter related to a motion control of the ship based on at least one of the first evaluation value and the second evaluation value.

According to this configuration, the control parameter can be set based on the first evaluation value which is indicative of the performance for maintaining the heading of the ship or the route based on the traveling state, and the second value which is related to the ship handling control based on control information. Therefore, the control parameter which takes the ship characteristics and the weather into consideration and can realize a stable control according to the condition of the ship can be set.

In the automatic steering device of this aspect, the processing circuitry may set the control parameter so that one of the first evaluation value and the second evaluation value which is higher in influence to an unstable motion of the ship is decreased.

According to this configuration, the control can be performed according to the ship condition.

The automatic steering device of this aspect, the processing circuitry may sets a first upper limit corresponding to the first evaluation value and a second upper limit corresponding to the second evaluation value. The processing circuitry may adjust the control parameter based on a relationship between the first evaluation value corresponding to the first upper limit and the second evaluation value corresponding to the second upper limit.

According to this configuration, since the upper limits for the evaluation values are set and used for setting the control parameter, a more appropriate control parameter can be set.

In the automatic steering device of this aspect, the processing circuitry may set the control parameter so that one of the first evaluation value and the second evaluation value of which the ratio is higher is decreased, based on a comparison of a ratio of the first evaluation value and the first upper limit, and a ratio of the second evaluation value and the second upper limit.

According to this configuration, the control can be performed according to the ship condition.

In the automatic steering device of this aspect, when the first evaluation value is higher than the first upper limit and the second evaluation value is higher than the second upper limit, the processing circuitry may raise the first upper limit and the second upper limit.

According to this configuration, it can be suppressed that the upper limits are set to be unnecessarily low. That is, the control parameter can be set more according to the actual cruise.

In the automatic steering device of this aspect, when a state where the first evaluation value is lower than the first upper limit or the second evaluation value is lower than the second upper limit continues for more than a given period of time, the processing circuitry may reduce at least one of the first upper limit and the second upper limit for which the evaluation value is lower than the upper limit.

According to this configuration, it can be suppressed that the upper limits are continuously set to be unnecessarily high, and the upper limits can be set according to the actual cruise of the ship. That is, the control parameter can be set more according to the actual cruise.

In the automatic steering device of this aspect, when the first evaluation value is higher than the first upper limit or the second evaluation value is higher than the second upper limit, the processing circuitry may set the control parameter so that one of the first evaluation value and the second evaluation value which is higher than the upper limit is decreased.

According to this configuration, the evaluation value among the first evaluation value and the second evaluation value which is problematic in the control is decreased, and thus, the control parameter which can realize the stable control can be set.

In the automatic steering device of this aspect, when the second evaluation value is higher than the second upper limit, the control parameter setting module may lower a control gain, and when the first evaluation value is higher than the first upper limit, the processing circuitry may raise the control gain.

According to this configuration, the control parameter can be set suitably according to the influence on the control of the ship given by the direction maintaining performance and the steering amount.

The automatic steering device of this aspect, the processing circuitry may determine a specific pair from a plurality of pairs of the first upper limit and the second upper limit that are set beforehand. The processing circuitry may set values of the specific pair determined by the processing circuitry as initial values of the first upper limit and the second upper limit.

According to this configuration, the control parameter intended by the user can be determined more easily.

In the automatic steering device of this aspect, the traveling state may be a ship heading of the ship. The first evaluation value may be an evaluation value of direction maintaining performance which is a performance for maintaining the heading. The processing circuitry may calculate the first evaluation value based on a standard deviation of a heading difference.

According to this configuration, a variation in the heading difference can be obtained statistically. Therefore, the first evaluation value according to the stability of the maintenance of the ship heading can be acquired.

In the automatic steering device of this aspect, the ship information may be a rudder angle of the ship. The second evaluation value may be an evaluation value of a steering amount. The processing circuitry may calculate the second evaluation value based on an average value of absolute values of the rudder angle measured in a given period of time.

According to this configuration, the average value of the rudder angles in the given period can be obtained. That is, the second evaluation value can be obtained from the actual rudder angle behavior.

According to another aspect of the present disclosure, an automatic steering system includes the automatic steering device and a command rudder angle calculating module. The command rudder angle calculating module calculates a command rudder angle based on the control parameter set by the control parameter setting module.

According to this configuration, the command rudder angle can be set suitably by using the suitable control parameter.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION OF THE DISCLOSURE

Figure 1:
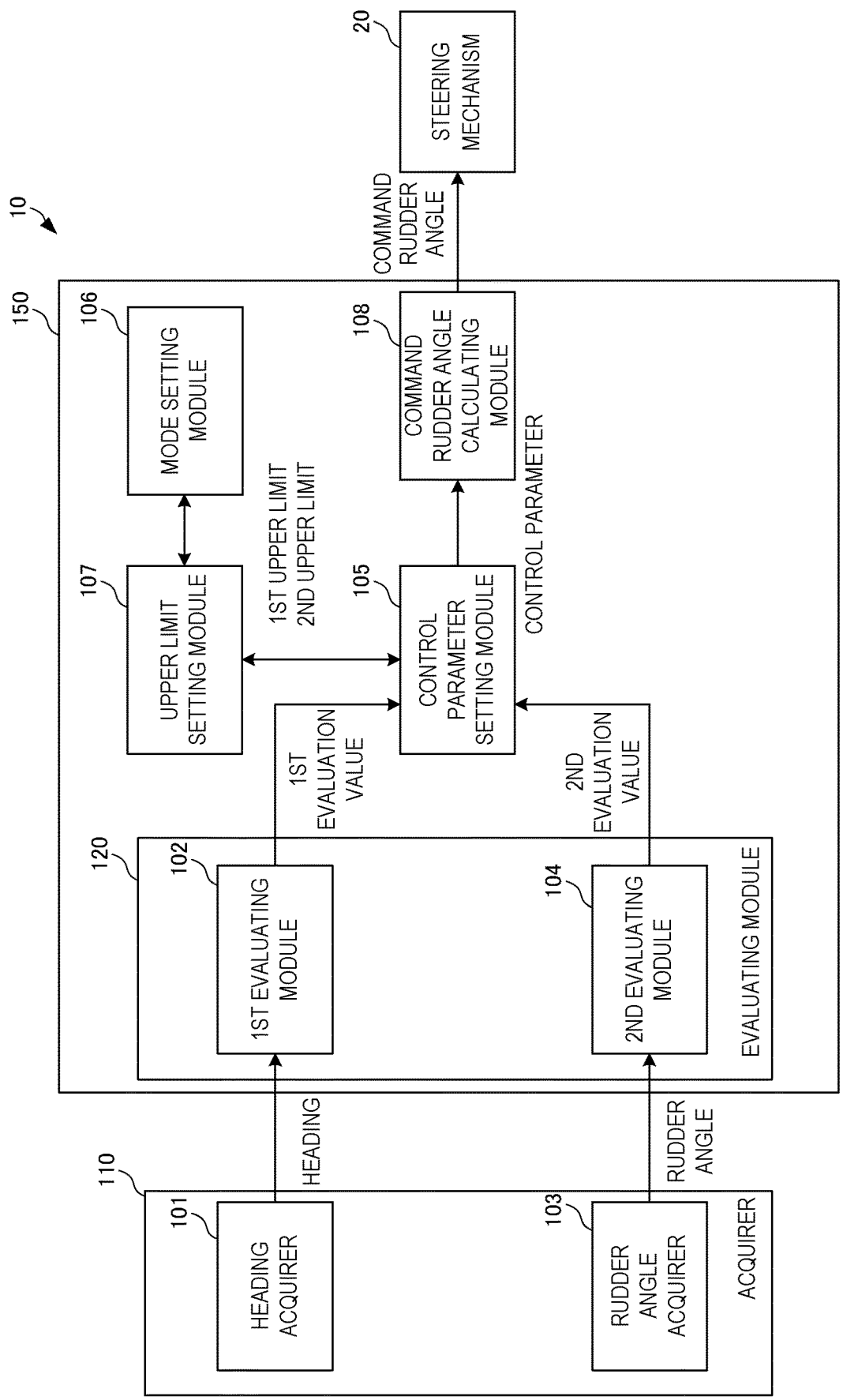
FIG. 1 is a functional block diagram illustrating a configuration of an automatic steering device according to one embodiment of the present disclosure.
Figure 2:
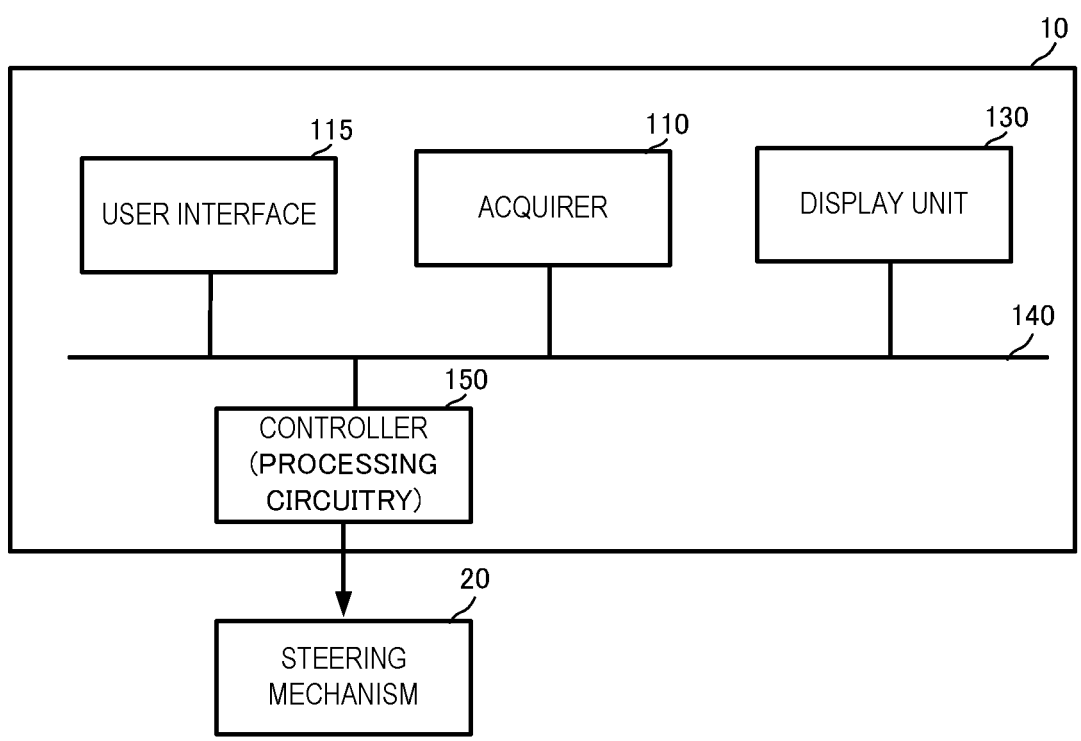
FIG. 2 is a functional block diagram illustrating a configuration of an automatic steering device according to one embodiment of the present disclosure.

Hereinafter, an automatic steering device, an automatic steering system, an automatic steering method, and an automatic steering program according to one embodiment of the present disclosure will be described with reference to the accompanying drawings. FIGS. 1 and 2 are functional block diagrams illustrating configurations of the automatic steering device according to this embodiment of the present disclosure.

First, a relationship related to setup of control parameters in the automatic ship speed control of a ship is illustrated. The control parameters may be determined by a relationship between a direction maintaining performance and a steering amount. This relationship between the direction maintaining performance and the steering amount may be a trade-off relationship. In detail, if the direction maintaining performance is improved (a control gain is raised), the steering amount may increase. On the other hand, if the steering amount is reduced (the control gain is lowered), the direction maintaining performance may be deteriorated.

Therefore, it may be necessary to set the control parameters in consideration of this relationship. That is, it may be preferred to calculate evaluation values for the direction maintaining performance and the steering amount, and set the control parameters so that the evaluation values are below reference values. In other words, the control parameters may be obtained according to the ship characteristics (the size, the weight, etc.) and the weather (oceanographic conditions), while balancing the direction maintaining performance and the steering amount. The detailed configuration of an automatic steering device 10 is described below.

The automatic steering device 10 may be provided to a ship, along with a steering mechanism 20. The ship may behave according to a rudder angle which is controlled by the steering mechanism 20. In more detail, the steering mechanism 20 may be controlled so that the rudder angle becomes a command rudder angle from the automatic steering device 10. The ship may realize going straight and making a turn by the rudder angle.

(Configuration of Automatic Steering Device 10)

As illustrated in FIG. 2, the automatic steering device 10 may be provided with an acquirer 110, a user interface 115, a display unit 130, and a controller 150 (or "processing circuitry").

The automatic steering device 10 may be provided to a ship which performs an autopilot control (automatic navigation control). The automatic steering device 10 may connect to the steering mechanism 20. Note that the steering mechanism 20 may be provided to various kinds of propelling devices, such as an outboard motor (engine), an inboard motor (engine), and an inboard-outdrive motor (engine).

The acquirer 110, the user interface 115, the display unit 130, and the controller 150 may connect to each other via a ship data communication network 140. The acquirer 110, the user interface 115, and the controller 150 may connect to each other, for example, via a propulsion communication network (CAN etc.). The controller 150 and the steering mechanism 20 may connect to each other via analog voltage or data communications.

Configurations of the user interface 115 and the display unit 130 are described with reference to FIG. 2. Other configurations will be described in detail below with reference to FIG. 1. The user interface 115 is realized, for example, by a touch panel, physical button(s), and/or physical switch(es). The user interface 115 may accept operation for setup of control parameters described below. The user interface 115 may output the control parameters to the controller 150.

The display unit 130 is realized, for example, by a liquid crystal panel. The display unit 130 may display information relevant to the control parameters inputted from the controller 150. Note that the display unit 130 may be omitted but the display unit 130 may be preferred to be provided so that a user can easily grasp a controlling state and a traveling state.

(Detailed Configuration of Automatic Steering Device 10)

FIG. 1 is a more-detailed functional block diagram of the automatic steering device 10 in FIG. 2. Note that, in FIG. 1, the configurations of the user interface 115 and the display unit 130 are omitted.

As illustrated in FIG. 1, the acquirer 110 may include a heading acquirer 101 and a rudder angle acquirer 103. The controller 150 may include an evaluating module 120, a control parameter setting module 105, a mode setting module 106, an upper limit setting module 107, and a command rudder angle calculating module 108. The evaluating module 120 may include a first evaluating module 102 and a second evaluating module 104.

The heading acquirer 101 is comprised of, for example, a magnetic sensor, an acceleration sensor, a satellite compass, and/or a GNSS receiver. The heading acquirer 101 may detect a traveling state which includes a direction of the bow (bow direction or heading) or a position of the ship by using the sensor(s). The heading acquirer 101 may output the traveling state to the first evaluating module 102. Note that the example below will be described while assuming that the traveling state is the heading.

The first evaluating module 102 may evaluate a latest direction maintaining performance based on time-series data of the heading. In detail, the first evaluating module 102 may calculate a standard deviation of a heading difference or azimuth angle difference (drift angle) as an evaluation value. The evaluation value calculated by the first evaluating module 102 may be treated as a first evaluation value $E\psi$. The first evaluation value $E\psi$ may be an evaluation value indicative of a performance for maintaining the heading (the direction of the ship) or the route. The first evaluation value $E\psi$ may increase as the direction maintaining performance deteriorates.

The first evaluating module 102 may output the first evaluation value $E\psi$ to the control parameter setting module 105.

The rudder angle acquirer 103 is comprised of, for example, a rudder angle sensor. The rudder angle acquirer 103 may detect ship information by using the rudder angle sensor. The rudder angle acquirer 103 may output the ship information to the second evaluating module 104. Note that the example below will be described while assuming that the ship information is a rudder angle.

The second evaluating module 104 may evaluate a latest steering amount based on time-series data of the rudder angle. In more detail, the second evaluating module 104 may calculate an absolute value of the rudder angle, and calculate an average of the absolute values for 1 second as an evaluation value of the steering amount. The evaluation value calculated by the second evaluating module 104 may be treated as a second evaluation value $E\delta$. The second evaluation value $E\delta$ may be an evaluation value related to a ship handling control based on the ship information.

The control parameter setting module 105 may determine whether the first evaluation value $E\psi$ or the second evaluation value $E\delta$ is an appropriate value. Then, the control parameter setting module 105 may set the control parameters based on the determination result of whether the first evaluation value $E\psi$ or the second evaluation value $E\delta$ is the appropriate value. In more detail, for example, the control parameter setting module 105 may compare a ratio of the first evaluation value $E\psi$ and a first upper limit $E\psi m$ with a ratio of the second evaluation value $E\delta$ and a second upper limit $E\delta m$, and set the control parameters so that one of the first evaluation value $E\psi$ and the second evaluation value $E\delta$ of which the ratio is higher is decreased. The control parameter setting module 105 may output these control parameters to the command rudder angle calculating module 108.

The mode setting module 106 may determine a mode based on the user's intention. This mode includes, for example, a mode in which course keeping accuracy is considered to be important (a course keeping accuracy oriented mode), and a mode in which a reduction of the steering amount is considered to be important (a steering amount reduction oriented mode). The mode may be determined based on a combination of the first upper limit $E\psi m$ and the second upper limit $E\delta m$. In more detail, the mode setting module 106 may set a plurality of combinations of the first upper limit $E\psi m$ and the second upper limit $E\delta m$. A user may select a desired mode corresponding to one of the combinations. As for the course keeping accuracy oriented mode, for example, the first upper limit $E\psi m$ is set as 0.1, and the second upper limit $E\delta m$ is set as 0.9. Further, as for the steering amount reduction oriented mode, for example, the first upper limit $E\psi m$ is set as 0.9, and the second upper limit $E\delta m$ is set as 0.1. Thus, by the user determining the mode, the mode setting module 106 can determine the first upper limit $E\psi m$ and the second upper limit $E\delta m$ which are intended by the user.

The upper limit setting module 107 may acquire the mode intended by the user from the mode setting module 106. According to the selected mode, the upper limit setting module 107 may set the upper limit for the first evaluation value $E\psi$ as the first upper limit $E\psi m$, and set the upper limit for the second evaluation value $E\delta$ as the second upper limit $E\delta m$. Note that initial values of the first upper limit $E\psi m$ and the second upper limit $E\delta m$ may be determined to be values according to the ship characteristics or the oceanographic conditions, or according to the history of values set in the past.

The command rudder angle calculating module 108 may calculate a command rudder angle, for example, by using the control parameters, and target values (a target heading etc.) and controlled variables (heading etc.). Here, for example, a PID control or a PFC is used as an algorithm for calculating the command rudder angle.

The command rudder angle thus calculated may be outputted to the steering mechanism 20. The steering mechanism 20 may determine the rudder angle based on the command rudder angle. Therefore, the ship may realize going straight and making a turn as described above.

(Method of Setting Control Parameters Using Automatic Steering Device 10)

Figure 3:
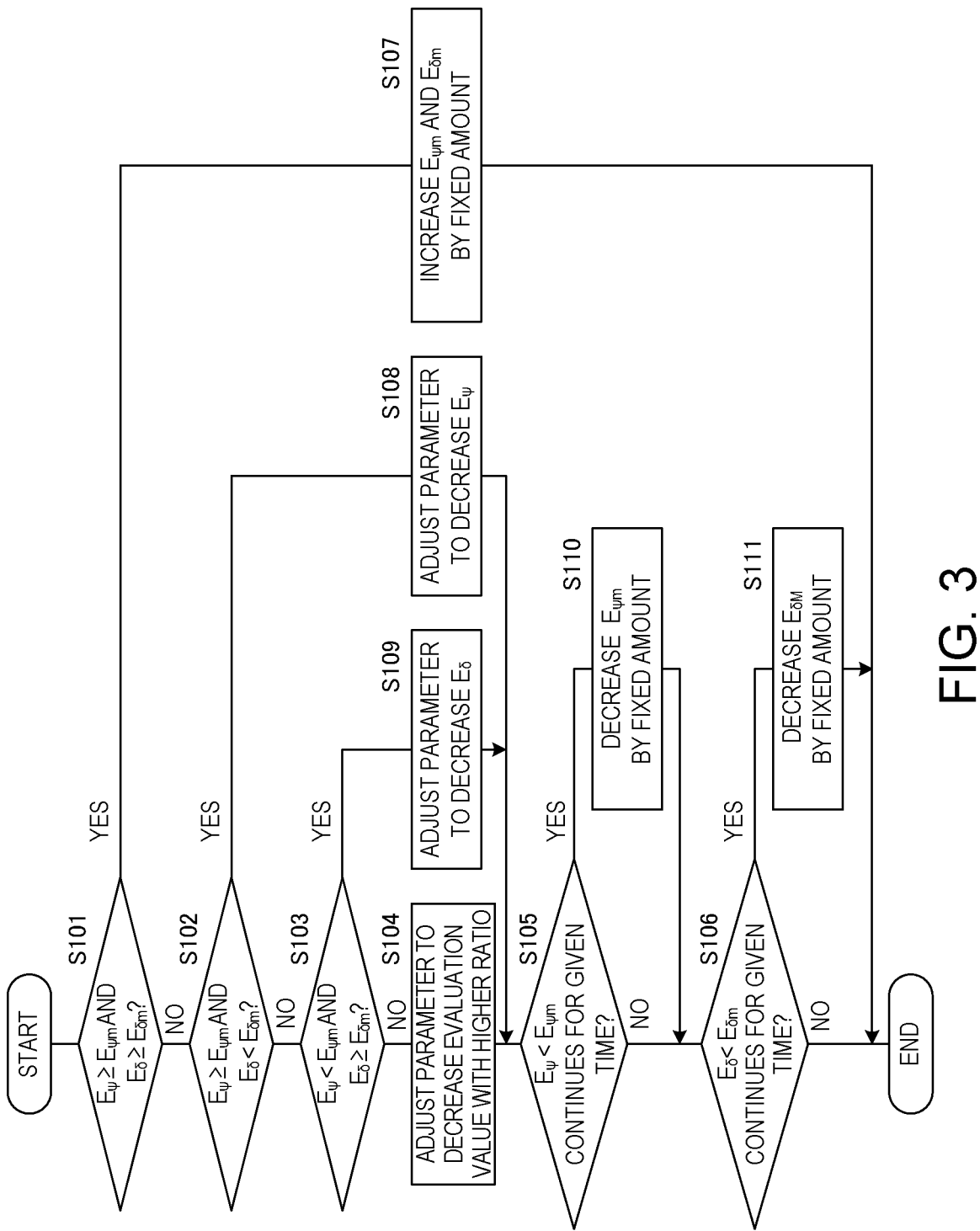
FIG. 3 is a flowchart illustrating processing of the automatic steering device according to this embodiment of the present disclosure.
Figure 4:
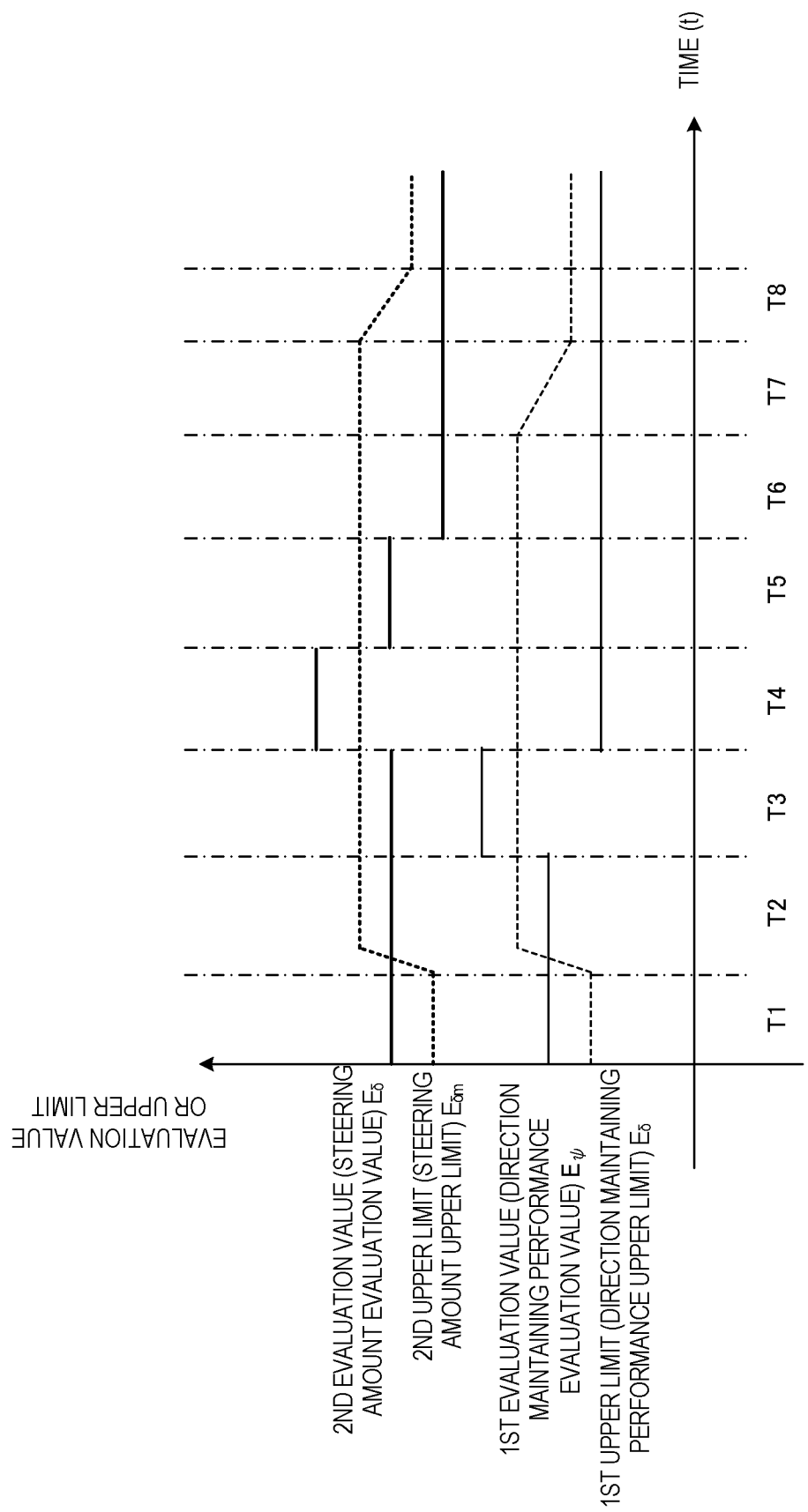
FIG. 4 is a graph in which upper limits of the automatic steering device according to this embodiment of the present disclosure are compared with evaluation values.
Figure 5:
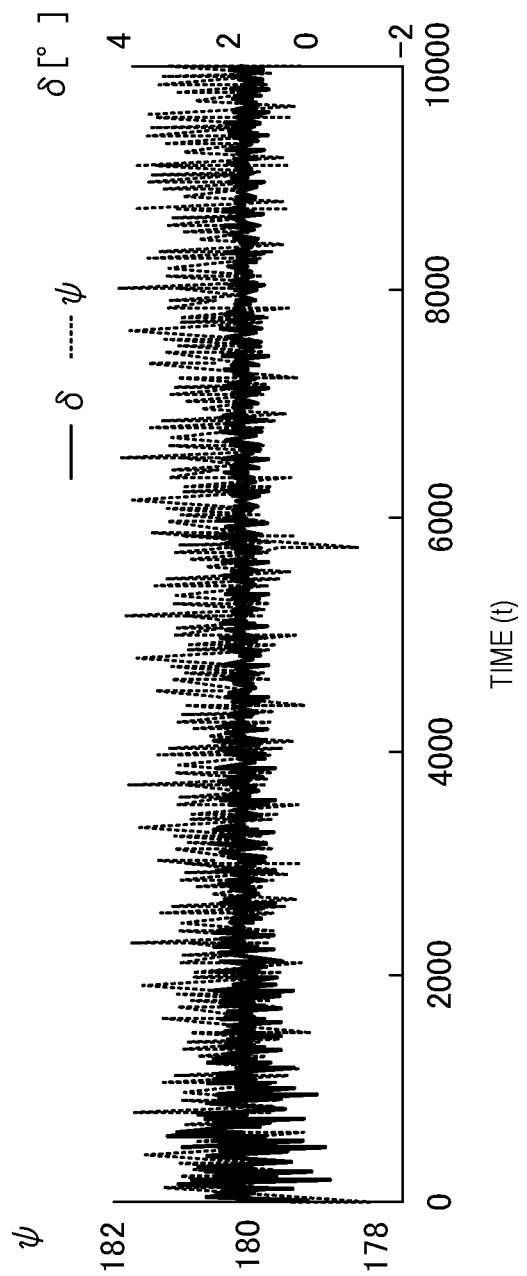
FIG. 5 is a graph illustrating a change in a rudder angle of the automatic steering device according to this embodiment of the present disclosure.

A method of setting the control parameters by using the automatic steering device 10 in order to determine the rudder angle described above is described. FIG. 3 is a flowchart illustrating processing of the automatic steering device according to this embodiment of the present disclosure. FIG. 4 illustrates a graph comparing the upper limit with the evaluation value in the automatic steering device according to this embodiment of the present disclosure. FIG. 5 is a graph illustrating changes in the heading and the rudder angle in the automatic steering device according to this embodiment of the present disclosure.

As described above, the control parameter setting module 105 may determine whether the first evaluation value $E\psi$ or the second evaluation value $E\delta$ is an appropriate value. Then, the control parameter setting module 105 may set the control parameters based on the determination result of whether the first evaluation value $E\psi$ or the second evaluation value $E\delta$ is an appropriate value.

Further, the control parameter setting module 105 may acquire the ratio of the first evaluation value Eψ and the first upper limit Eψm, and the ratio of the second evaluation value Eδ and the second upper limit Eδm. The control parameter setting module 105 may compare the ratio of the first evaluation value Eψ and the first upper limit Eψm with the ratio of the second evaluation value Eδ and the second upper limit Eδm, and set the control parameters so that one of the first evaluation value and the second evaluation value of which the ratio is higher is decreased. The details will be described below.

The control parameter setting module 105 may determine whether [the first evaluation value Eψ≥the first upper limit Eψm] and [the second evaluation value Eδ≥the second upper limit Eδm] (S101), as illustrated by T1 in FIG. 4. This may determine whether the first upper limit Eψm and the second upper limit Eδm are too low (i.e., parameters according to the ship characteristics and the oceanographic conditions are set).

If [the first evaluation value Eψ≥the first upper limit Eψm] and [the second evaluation value Eδ≥the second upper limit Eδm] (S101: Yes), the upper limit setting module 107 may set so as to increase the first upper limit Eψm and the second upper limit Eδm by a fixed amount (S107). This fixed amount may be determined arbitrarily, and may be preferred to be determined according to the ship characteristics and the oceanographic conditions.

If it is not satisfied that [the first evaluation value Eψ≥the first upper limit Eψm] and [the second evaluation value Eδ≥the second upper limit Eδm] (S101: No), the control parameter setting module 105 may determine whether [the first evaluation value Eψ≥the first upper limit Eψm] and [the second evaluation value Eδ<the second upper limit Eδm] (whether the evaluation values are in the state illustrated by T3 in FIG. 4) (S102).

If [the first evaluation value Eψ≥the first upper limit Eψm] and [the second evaluation value Eδ<the second upper limit Eδm] (S102: Yes), the control parameter setting module 105 may set so as to decrease the first evaluation value Eψ (S108).

If it is not satisfied that [the first evaluation value Eψ≥the first upper limit Eψm] and [the second evaluation value Eδ<the second upper limit Eδm] (S102: No), the control parameter setting module 105 may determine whether [the first evaluation value Eψ<the first upper limit Eψm] and [the second evaluation value Eδ≥the second upper limit Eδm] (whether the evaluation values are in the state illustrated by T4 in FIG. 4) (S103).

If [the first evaluation value Eψ<the first upper limit Eψm] and [the second evaluation value Eδ≥the second upper limit Eδm] (S103: Yes), the control parameter setting module 105 may set so as to decrease the second evaluation value Eδ (S109).

If it is not satisfied that [the first evaluation value Eψ<the first upper limit Eψm] and [the second evaluation value Eδ≥the second upper limit Eδm] (S103: No), the control parameter setting module 105 may compare "the ratio of the first evaluation value Eψ and the first upper limit Eψm" with "the ratio of the second evaluation value Eδ and the second upper limit Um" for the first evaluation value Eψ and the first upper limit Eψm, and the second evaluation value Eδ and the second upper limit Eδm. Thus, the control parameter setting module 105 may set the control parameters so that one of the evaluation values of which the ratio is higher is decreased (S104). This illustrates the processing from T5 to T6 in FIG. 4. Thus, the control parameter setting module 105 may set the control parameters so that the second evaluation value Eδ decreases.

The control parameter setting module 105 may determine whether the state of [the first evaluation value Eψ<the first upper limit Eψm] continues for a given period of time (S105).

If it is determined that the state of [the first evaluation value Eψ<the first upper limit Eψm] continues for the given period of time (from T4 to T6 in FIG. 4) (S105: Yes), the upper limit setting module 107 may decrease the first upper limit Eψm by a fixed amount (S110), as illustrated by T7 in FIG. 4. That is, the upper limit setting module 107 may set the excessively-high first upper limit Eψm to be a proper upper limit. By having such a configuration, the control parameter setting module 105 can set the control parameters for the first evaluation value Eψ according to the ship characteristics and the oceanographic conditions.

If it is not determined that the state of [the first evaluation value Eψ<the first upper limit Eψm] continues for the given period of time (S105: No), the control parameter setting module 105 may determine whether the state of [the second evaluation value Eδ<the second upper limit Eδm] continues for a given period of time (S106).

If it is determined that the state of [the second evaluation value Eδ<the second upper limit Eδm] continues for the given period of time (from T5 to T7 in FIG. 4) (S106: Yes), the upper limit setting module 107 may decrease the second upper limit Eδm by a fixed amount (S111), as illustrated by T8 in FIG. 4. That is, the upper limit setting module 107 may set so that the excessively-high second upper limit Eδm becomes a proper upper limit. By having such a configuration, the control parameter setting module 105 can set the control parameters for the second evaluation value Eδ according to the ship characteristics and the oceanographic conditions.

If it is not determined that the state of [the second evaluation value Eδ<the second upper limit Eδm] continues for the given period of time (S106: No), the control parameter setting module 105 may determine that the control parameters become the proper value, and terminates this processing.

By adjusting the control parameters as described above, the amount of change in the rudder angle δ can be decreased and stabilized, as illustrated in FIG. 5. In more detail, the rudder angle (steering amount) may be large at 0 sec point. However, by the control parameter setting module 105 adjusting the control parameters, the amount of change in the rudder angle can be reduced, for example, at 10,000 sec point.

Further, by adjusting the control parameters as described above, the heading ψ can be stabilized within a given angle range, as illustrated in FIG. 5.

By such a configuration, the control using the control parameters in consideration of the ship characteristics and the weather can be efficiently performed.

Note that, although in the above-described configuration the control parameter setting module 105 performs the control for adjusting the first evaluation value Eψ and the second evaluation value Eδ, the control parameter setting module 105 may be configured to adjust the control parameters using either the first evaluation value Eψ or the second evaluation value Eδ.

Further, in the illustrated example, the direction maintaining performance is used as the first evaluation value Eψ. However, as for the first evaluation value, the direction maintaining performance may not be used as the evaluation value, but the course (route) maintaining performance may be evaluated. In more detail, an integrated value of cross track errors etc. may be used as the evaluation value.

Further, in the illustrated example, the steering amount is used as the second evaluation value Eδ. However, as for the second evaluation value, the steering amount may not be used as the evaluation value, but an index for consciousness of the energy saving may be evaluated. In more detail, as the evaluation value, a fuel consumption, a forward drag increase by steering, etc. may be used.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom,"

"top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. An automatic steering device, comprising:
   a sensor configured to acquire a traveling state including a heading or a position of a ship, and ship information on the ship; and
   processing circuitry configured to:
   calculate a first evaluation value that is an evaluation value indicative of a performance for maintaining the heading of the ship or a route based on the traveling state;
   calculate a second evaluation value that is an evaluation value related to a ship handling control based on the ship information;
   set a control parameter related to a motion control of the ship based on the first evaluation value or the second evaluation value;
   set a first upper limit corresponding to the first evaluation value and a second upper limit corresponding to the second evaluation value;
   adjust the control parameter based on a relationship between the first evaluation value and the second evaluation value;
   calculate a command rudder angle based on an algorithm for calculating the command rudder angle with the control parameter; and
   control a rudder angle of a rudder of the ship based on the command rudder angle.

2. The automatic steering device of claim 1, wherein the processing circuitry is further configured to:
   set the control parameter so that one of the first evaluation value and the second evaluation value that is higher in influence to an unstable motion of the ship is decreased.

3. The automatic steering device of claim 1, wherein the processing circuitry is further configured to:
   set the control parameter so that one of the first evaluation value and the second evaluation value is decreased, based on a comparison of a ratio of the first evaluation value and the first upper limit, and a ratio of the second evaluation value and the second upper limit.

4. The automatic steering device of claim 1, wherein the processing circuitry is further configured to:
   raise the first upper limit and the second upper limit when the first evaluation value is higher than the first upper limit and the second evaluation value is higher than the second upper limit.

5. The automatic steering device of claim 1, wherein the processing circuitry is further configured to:
   reduce the first upper limit or the second upper limit for which the evaluation value is lower than the upper limit when a state where the first evaluation value is lower than the first upper limit or the second evaluation value is lower than the second upper limit continues for more than a given period of time.

6. The automatic steering device of claim 1, wherein the processing circuitry is further configured to:
   set the control parameter so that one of the first evaluation value and the second evaluation value that is higher than the upper limit is decreased when the first evaluation value is higher than the first upper limit or the second evaluation value is higher than the second upper limit.

7. The automatic steering device of claim 6, wherein the processing circuitry is further configured to:
   lower a control gain when the second evaluation value is higher than the second upper limit, and raise the control gain when the first evaluation value is higher than the first upper limit.

8. The automatic steering device of claim 1, wherein the processing circuitry is further configured to:
   determine a specific pair from a plurality of pairs of the first upper limit and the second upper limit that are set beforehand, and
   set values of the specific pair as initial values of the first upper limit and the second upper limit.

9. An automatic steering device comprising:
   a sensor configured to acquire a traveling state including a heading or a position of a ship, and ship information on the ship, the traveling state being the heading of the ship; and
   processing circuitry configured to:
   calculate a first evaluation value that is an evaluation value indicative of a performance for maintaining the heading of the ship or a route based on the traveling state, the first evaluation value being an evaluation value of heading maintaining performance, and the first evaluation value being calculated based on a standard deviation of a heading difference;
   calculate a second evaluation value that is an evaluation value related to a ship handling control based on the ship information;
   set a control parameter related to a motion control of the ship based on the first evaluation value or the second evaluation value;
   calculate a command rudder angle based on an algorithm for calculating the command rudder angle with the control parameter; and
   control a rudder angle of a rudder of the ship based on the command rudder angle.

10. The automatic steering device of claim 1, wherein
    the ship information is the rudder angle of the rudder of the ship,
    the second evaluation value is an evaluation value of a steering amount, and the processing circuitry is further configured to:
calculate the second evaluation value based on an average value of absolute values of the rudder angle measured in a given period of time.

11. An automatic steering system, comprising:
the automatic steering device of claim 1; and
a steering mechanism configured to receive the command rudder angle and control the rudder angle of the rudder based on the command rudder angle.

12. The automatic steering device of claim 2, wherein the processing circuitry is further configured to:
set the control parameter so that one of the first evaluation value and the second evaluation value is decreased, based on a comparison of a ratio of the first evaluation value and the first upper limit, and a ratio of the second evaluation value and the second upper limit.

13. The automatic steering device of claim 12, wherein the processing circuitry is further configured to:
raise the first upper limit and the second upper limit when the first evaluation value is higher than the first upper limit and the second evaluation value is higher than the second upper limit.

14. The automatic steering device of claim 13, wherein the processing circuitry is further configured to:
set the control parameter so that one of the first evaluation value and the second evaluation value that is higher than the upper limit is decreased when the first evaluation value is higher than the first upper limit or the second evaluation value is higher than the second upper limit.

15. The automatic steering device of claim 14, wherein the traveling state is the heading of the ship,
wherein the first evaluation value is an evaluation value of heading maintaining performance, and wherein the processing circuitry is further configured to:
calculate the first evaluation value based on a standard deviation of a heading difference.

16. The automatic steering device of claim 15, wherein the ship information is the rudder angle of the rudder of the ship,
the second evaluation value is an evaluation value of a steering amount, and
the processing circuitry is further configured to:
calculate the second evaluation value based on an average value of absolute values of the rudder angle measured in a given period of time.

17. An automatic steering method, comprising the steps of:
acquiring a traveling state including a heading or a position of a ship, and ship information on the ship;
calculating a first evaluation value that is an evaluation value indicative of a performance for maintaining the heading of the ship or a route based on the traveling state;
calculating a second evaluation value that is an evaluation value related to a ship handling control based on the ship information;
setting a control parameter related to a motion control of the ship based on the first evaluation value or the second evaluation value;
setting a first upper limit corresponding to the first evaluation value and a second upper limit corresponding to the second evaluation value;
adjusting the control parameter based on a relationship between the first evaluation value and the second evaluation value;
calculating a command rudder angle based on an algorithm for calculating the command rudder angle with the control parameter; and
controlling a rudder angle of a rudder of the ship based on the command rudder angle.

18. A non-transitory computer-readable storage medium storing processor-executable instructions that, when executed, cause one or more processors to perform the method of claim 17.

19. An automatic steering method, comprising the steps of:
acquiring a traveling state including a heading or a position of a ship, and ship information on the ship, the traveling state being the heading of the ship;
calculating a first evaluation value that is an evaluation value indicative of a performance for maintaining the heading of the ship or a route based on the traveling state, the first evaluation value being an evaluation value of heading maintaining performance, and the first evaluation value being calculated based on a standard deviation of a heading difference;
calculating a second evaluation value that is an evaluation value related to a ship handling control based on the ship information;
setting a control parameter related to a motion control of the ship based on the first evaluation value or the second evaluation value;
calculating a command rudder angle based on an algorithm for calculating the command rudder angle with the control parameter; and
controlling a rudder angle of a rudder of the ship based on the command rudder angle.

20. A non-transitory computer-readable storage medium storing processor-executable instructions that, when executed, cause one or more processors to perform the method of claim 19.

* * * * *